United States Patent

White, Jr.

[15] 3,695,634
[45] Oct. 3, 1972

[54] ADJUSTABLE LENGTH COUPLING
[72] Inventor: William E. White, Jr., Houston, Tex.
[73] Assignee: Hydro Tech Services, Inc., Houston, Tex.
[22] Filed: Oct. 19, 1970
[21] Appl. No.: 81,681

[52] U.S. Cl. .................285/31, 285/93, 285/286, 285/322, 285/342, 285/DIG. 21
[51] Int. Cl. ................................F16l 21/00
[58] Field of Search........285/18, 24, 27, 94, 101, 93, 285/105, 165, 298, 302, 308, 322, 342, 323, 373, 286, 419, 421, 348, 343, DIG. 21, 31, 322; 166/0.6

[56] References Cited

UNITED STATES PATENTS

| 3,598,429 | 6/1971 | Arnold .........................285/18 |
| 666,316 | 1/1901 | Kenneally.....................285/31 |
| 3,131,642 | 5/1964 | Geer et al. ..............285/302 X |
| 3,494,638 | 2/1970 | Todd et al. ...................285/93 |
| 3,451,483 | 6/1969 | Von Houttel et al. ..285/302 X |
| 2,700,370 | 1/1955 | Goff........................285/302 X |
| 2,733,939 | 2/1956 | Scherer..................285/372 X |
| 3,393,926 | 6/1968 | Arnold .........................285/18 |

FOREIGN PATENTS OR APPLICATIONS

| 10,570 | 1903 | Great Britain..............285/302 |
| 761,275 | 1/1953 | Germany....................285/302 |

Primary Examiner—Dave W. Arola
Attorney—Paul E. Harris, Lee R. Larkin and Marcus L. Thompson

[57] ABSTRACT

Adjustable length coupling including coaxial telescoping housings arranged for connection at their axially outward ends to other members. Tapered slips and radially deformable packers located in an annulus between the housings are arranged for actuation by an hydraulic force into restraining and sealing engagement between the housings to prevent relative movement between the housings after installation. The coupling may be used in construction of structures and to make connections between pipe sections.

1 Claim, 2 Drawing Figures

PATENTED OCT 3 1972 3,695,634

William E. White, Jr.
INVENTOR.

BY Lee R. Larkin 3,695,634

ADJUSTABLE LENGTH COUPLING

BACKGROUND OF THE INVENTION

1. Field of the Invention

An hydraulically actuated adjustable length coupling.

2. Description of the Prior Art

When joining together two pipes or other members it frequently becomes necessary to adjust the separation or axial spacing of the members in order to secure a coupling therebetween. In many instances involving structural construction and pipeline installation, particularly in a hostile environment such as underwater, it is very difficult, time consuming and expensive to make the required spacing adjustment between the members and use of an adjustable length coupling is desirable.

Various prior art couplings have been offered to solve this connection problem. Some of these couplings are arranged to retain their adjustability throughout their useful life and clearly are not suitable where a strong and rigid permanent connection is required. Other prior art couplings are arranged for actuation to a locked or permanent position after installation. However, all of the known couplings of this latter type are comparatively difficult to install and actuate and many of the couplings of this type are not as strong as the members coupled thereto. Additionally, some of the couplings of this type are not pressure tight and are therefore unsuitable for joining pipeline sections intended for high pressure fluid transmission.

SUMMARY OF THE INVENTION

This invention comprises a coupling adapted for use in the construction of structures and in connecting together tubular segments such as pipes. The coupling is initially adjustable in length and is arranged to be locked at a desired length after installation. The invention includes in combination first and second housings arranged for generally coaxial telescopic movement, with means connected to the spaced apart ends of the housings for connecting the coupling to spaced apart members. The invention also includes gripping means mounted between the housings arranged for actuation into engagement with one of the housings for rigidly holding the housings in a fixed telescopic position. Means are provided for applying an hydraulic actuating force against the gripping means.

When the coupling is used to connect pipe segments, the invention preferably includes means for creating a pressure tight seal between the housings to prevent fluid flow therebetween.

So that the coupling will withstand axial forces in both tension and compression after installation, the gripping means of this invention preferably includes at least two longitudinally spaced apart oppositely facing slips arranged to be wedged between the housings upon actuation thereof. Means are provided for retaining the slips in a disengaged position prior to actuation thereof.

The pressure tight seal means preferably includes two longitudinally spaced apart deformable annular members positioned between the housings and arranged for actuation into sealing engagement therebetween. Means are also provided for injecting a pressurized fluid between the housings intermediate the annular members to test the sealing engagement thereof.

DESCRIPTION OF THE PREFERRED EMBODIMENT

Figure 1:
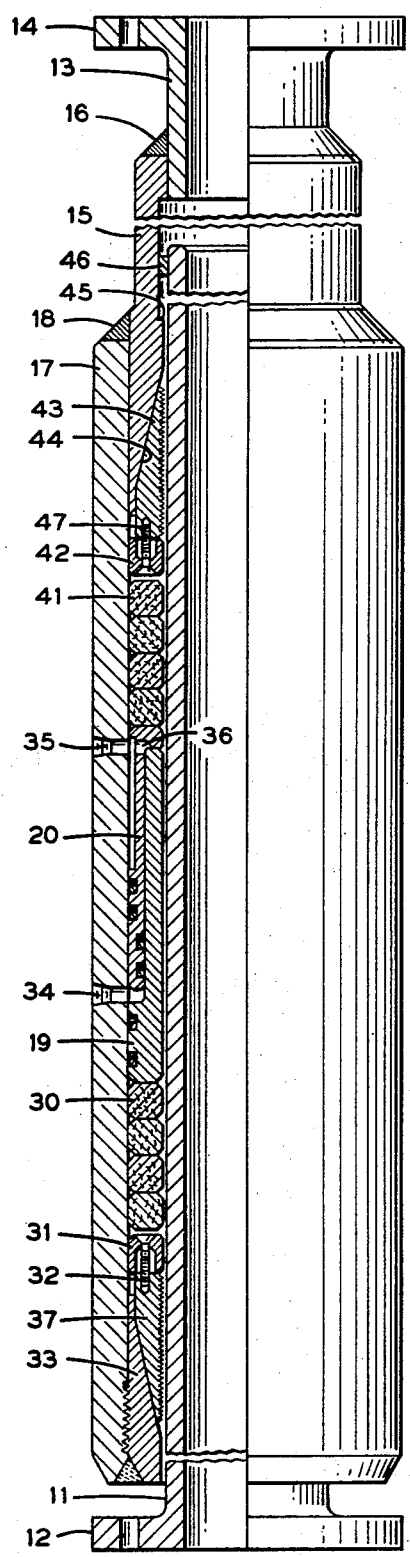
FIG. 1 is a partial central sectional view of a preferred embodiment of this invention prior to actuation thereof.

Referring to the drawing and particularly to FIG. 1, one embodiment of this adjustable length coupling invention preferred by the inventor is illustrated in a partial central sectional view. A first elongate tubular housing 17, including tubular extension 15 rigidly connected thereto by weld 18, forms the outside of the coupling. A second elongate tubular housing 11 is positioned within housing 17 and extension 15, and is arranged for telescoping relative axial movement therewith.

Means for connecting the axially spaced apart ends of the coupling to the spaced apart members to be joined are provided in the form of a flange 12 formed on the lower end of inner housing 11, as viewed in FIG. 1, and a similar flange 14 formed on the upper end of a tube 13 which is connected to extension 15 by weld 16. Other means may be used for connecting housings 11 and 17 to the members to be joined. For example, ball joints, such as the Standard Series ball joints manufactured by Barco Division of Aeroquip Corporation of Barrington, Ill., may be used on one or both ends of the coupling in place of flanges 12 and 14 when the coupling is required for connecting misaligned members. Similarly, either or both of flanges 12 and 14 could be replaced with bias cut flanges or other coupling means, as required.

Means for rigidly holding housings 17 and 11 in a fixed relative position are provided in the annulus therebetween and include an inwardly facing frusto-conically shaped tapered bowl 33 threadably secured to the inside lower end of housing 17. A second frusto-conically shaped tapered bowl 44 is formed on the lower end of tubular extension 15 and is arranged to face inwardly towards bowl 33. Slidably positioned within bowls 33 and 44 are tapered slip assemblies 37 and 43, respectively, which slip assemblies are each formed of partial cylindrical segments. Since bowls 33 and 44 are and mating slip assemblies 37 and 43 face in opposite directions, they will act to resist both tension and compression forces when set.

A cylindrical thrust ring 31 is slidably positioned between housings 17 and 11 adjacent the upper end of slip assemblies 37 and is attached to the segments of slip 37 by screws 32. A similar cylindrical thrust ring 42 is slidably positioned between housings 17 and 11 adjacent the lower end of slip assemblies 43 and is similarly attached to the segments of slip 43 by screws 47. Rings 31 and 42 and screws 32 and 47 provide means for retaining slips 37 and 43 in circumferentially spaced, disengaged positions prior to actuation thereof. Upon application of downwardly and upwardly directed axial forces upon rings 31 and 42, respectively, as described below, slips 37 and 43 will be forced radially inward by bowls 33 and 44, respectively, into engagement with housing 11. Screws 32 and 47 are arranged to bend and/or to shear off as slips 37 and 43 move radially inward.

Means for creating annular pressure tight seals between housings 17 and 11 are provided in the form of packings 30 and 41 which are positioned adjacent the inward ends of rings 31 and 42, respectively. Packings 30 and 41 are formed of deformable material and are generally tubular in shape. Packings 30 and 41 each may be constructed in the form of a plurality of adjacent parallel rings, as shown, may be unitary cylindrical members, or may assume other equivalent configuration. For proper pressure tight sealing it is necessary only that packings 30 and 41 deform radially when subjected to an axial force.

Centrally positioned within housing 17 between packings 30 and 41 are generally cylindrical opposing pistons 19 and 20, which pistons are arranged for axial sliding movement relative to housings 11 and 17. O-ring seals are provided between pistons 19 and 20 and the inside of housing 17 so that a fluid pressure force injected between pistons 19 and 20 through orifice 34 in housing 17 will cause pistons 19 and 20 to move in axially opposed directions. Downward movement of piston 19, as viewed in FIG. 1, will transmit an axial actuation force to packing 30 and to slip assembly 37, and upward movement of piston 20 will transmit an opposing axial actuation force to packing 41 and slip assembly 43.

Means for testing the seals formed between housings 11 and 17 by packings 30 and 41 are provided by testing orifice 35 through housing 17 and testing orifice 36 through piston 20. After packings 30 and 41 are actuated, a pressurized fluid may be injected between housings 11 and 17 intermediate packings 30 and 41, through orifices 35 and 36, and a loss of pressure in this fluid would indicate that either or both of packings 30 and 41 have not radially deformed properly.

In order to limit the range of telescopic movement between housings 11 and 17 prior to actuation of the above described gripping means, a portion of the inside circumferential surface of tubular extension 15 is radially enlarged and a ring shaped stop lug 46 is suitably secured to the outside of the upper end of inner housing 11. Lug 46 is arranged to slide freely on the enlarged inside portion of tube 15 between shoulder 46 and the lower end of tube 13, and this free sliding axial distance is the adjustment range of the coupling. Any desired preactivation adjustment range may be provided in the coupling by suitably selecting the length of tubular extension 15. In operation flanges 12 and 14 are first connected to the members to be joined and a pressurized fluid is injected through orifice 34 to activate and lock the coupling. If a permanent setting of the coupling is desired, a hardenable epoxy resin fluid may be used as the pressurized activation fluid. If desired, a pressurized fluid may then be injected through orifice 35 to test packings 30 and 41, as described above. To further lock the coupling in a permanent connection, an epoxy resin could also be used as the packing test fluid or could be injected through orifice 35 after testing the packing seals.

Figure 2:
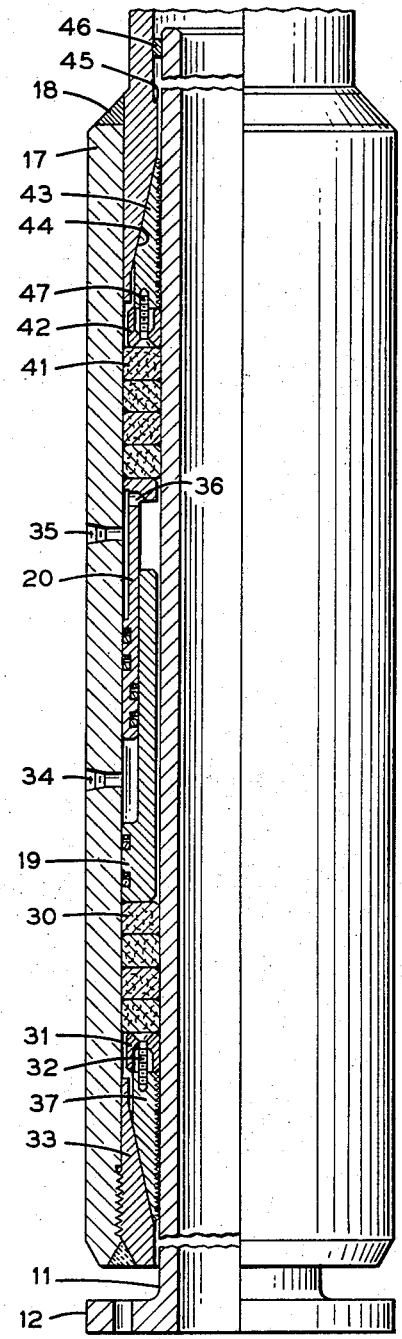
FIG. 2 is a view similar to FIG. 1 showing the coupling actuated and rigid.

FIG. 2 illustrates a coupling like that described above which has been actuated by injecting a pressurized fluid between pistons 18 and 19 through orifice 34. As shown, packings 30 and 41 have been axially compressed and radially deformed into sealing engagement between housings 11 and 17, and slip assemblies 37 and 43 have moved radially inward into gripping engagement with housing 11. The coupling thus assumes a rigid, pressure tight configuration suitable for use in connecting structural members or pipeline segments designed for the transmission of pressurized fluids.

Further modifications and alternative embodiments of the invention will be apparent to those skilled in the art in view of this description. Accordingly, this description is to be construed as illustrative only and is for the purpose of teaching those skilled in the art the manner of carrying out the invention. It is to be understood that the form of the invention herewith shown and described is to be taken as the presently preferred embodiment. Various changes may be made in the shape, size and arrangement of parts. For example, equivalent elements or materials may be substituted for those illustrated and described herein, parts may be reversed, and certain features of the invention may be utilized independently of the use of other features, all as would be apparent to one skilled in the art after having the benefit of this description of the invention.

What is claimed is:

1. In an adjustable length coupling for joining two axially spaced apart pipes, the combination comprising:

first and second housings arranged in telescoping movement with respect to each other;

means for connecting each of the axially spaced apart ends of said housings to one of said pipes;

two longitudinally spaced apart oppositely facing pluralities of slips positioned between said housings and arranged for wedging engagement of said housings upon actuation thereof;

a pair of seals mounted and arranged between said housings for sealing engagement therewith in longitudinally spaced apart positions, with one of said seals being operatively associated with one of said pluralities of slips;

a first cylindrical piston mounted between said housings and arranged for longitudinal movement to engage one of said seals which in turn engages one of said pluralities of slips, to thereby actuate said seal and slips to the sealing and gripping position of said housings;

a second cylindrical piston mounted between said housings and adjacent said first piston and arranged for longitudinal movement to engage the other one of said seals which in turn engages the other one of said pluralities of slips, to thereby actuate said other seals and slips to the sealing and gripping positions of said housings, said first and second pistons having means for forming a closed pressure chamber therebetween such that application of a pressurized fluid thereto causes said pistons to move axially apart to thereby actuate said seals and slips;

means for injecting an hydraulic fluid into said pressure chamber to actuate said coupling to the set position;

means for injecting another pressurized fluid between said housings intermediate said seals to test said seals after actuation thereof, and means for limiting the range of telescopic movement between said housings before actuation of said gripping means so that all said seals and slips will engage both said housings.

* * * * *